April 14, 1931.   W. TIMSON   1,800,850
PRINTING MECHANISM FOR USE WITH WEIGHING APPARATUS
Filed Jan. 29, 1929   2 Sheets-Sheet 1

Inventor:- William Timson
Per:- George T. Folkes.
Attorney

April 14, 1931.  W. TIMSON  1,800,850
PRINTING MECHANISM FOR USE WITH WEIGHING APPARATUS
Filed Jan. 29, 1929   2 Sheets-Sheet 2

Inventor:- William Timson
Per:- George E. Folkes.
Attorney

Patented Apr. 14, 1931

1,800,850

UNITED STATES PATENT OFFICE

WILLIAM TIMSON, OF BIRMINGHAM, ENGLAND, ASSIGNOR TO W. & T. AVERY LIMITED, OF SOHO FOUNDRY, BIRMINGHAM, ENGLAND

PRINTING MECHANISM FOR USE WITH WEIGHING APPARATUS

Application filed January 29, 1929, Serial No. 335,967, and in Great Britain March 30, 1928.

This invention has reference to improvements in or relating to printing mechanism for use with weighing apparatus and is concerned more particularly with printing mechanism for use with counter scales of the kind embodying rotary weight indicating mechanism the invention having for its object the provision of a printing mechanism which is simple in construction, efficient in operation and capable of being adapted to existing types of weighing scale of the aforesaid kind without necessitating any material alternation thereto.

The invention consists of an improved printing mechanism for weighing apparatus, wherein the printing type is mounted on or formed in the face of a rotatable member and wherein the impression is obtained by moving a ticket or tape into contact with the type face by means of a pair of pivotal members disposed one on either side of the rotatable member one of the said pivotal members preferably carrying a printing index. The invention also resides in the details of construction of the printing mechanism to be described hereinafter.

The invention will now be described with particular reference to the accompanying sheet of drawings, wherein:—

Figures 1, 3:
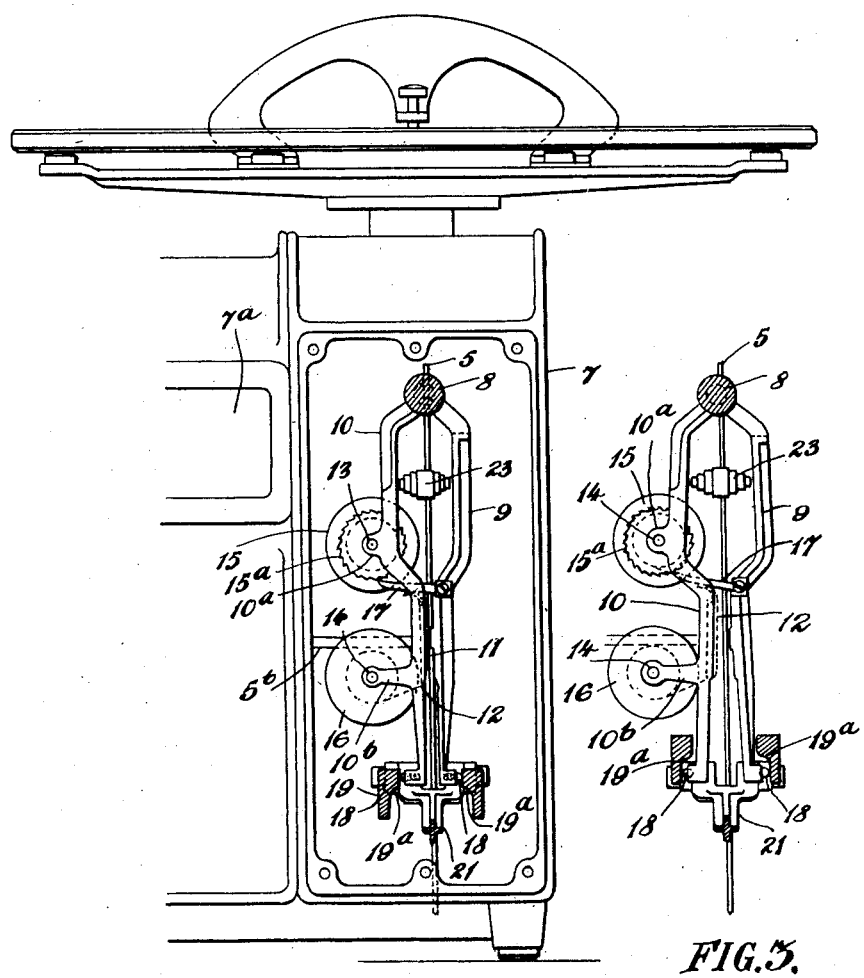
Figure 1 is a part sectional end elevation of the printing mechanism embodied in a weighing apparatus of known kind sufficient only of which is shown as is necessary to an understanding of the invention, the printing mechanism being seen in the printing position.
Figure 3 is a part sectional end elevation of the printing mechanism separately with the parts shown in the non-printing position.
Figure 2:
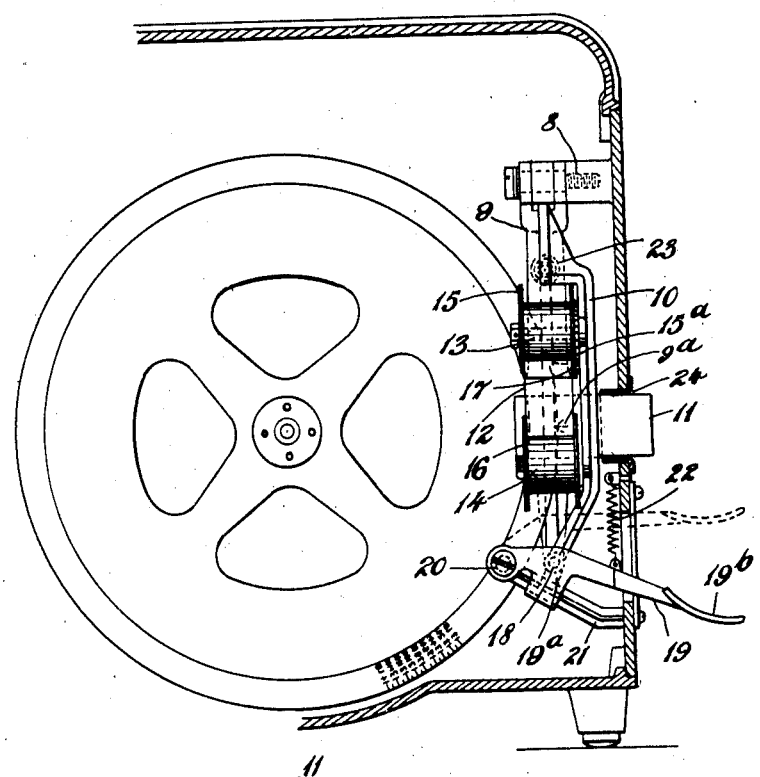
Figure 2 is a part sectional side elevation of the printing mechanism and adjacent parts of the known construction of weighing apparatus a portion of which is illustrated in Figure 1 showing the printing mechanism in the printing position.

The known construction of weighing apparatus illustrated in the drawings is of the kind wherein the weight indicating mechanism comprises a rotatable drum adapted to register with a fixed index (not shown) carried by a casing 7 within which the indicating mechanism as a whole is contained said index and the graduations on the drum being visible through a window 7ª formed in the casing 7.

According to the invention the rotary spindle 5ᵇ carrying the drum is extended at one end and has secured thereon a dial 5 to one face whereof adjacent the peripheral edge is fixed an annular disc the face whereof is graduated and provided with type numerals the graduations and type numerals preferably being formed in the face of the annular disc by an etching or an electro-chemical process. Pivotally mounted on a stud 8 secured within a boss which projects inwardly from the casing are the upper ends of a pair of members 9, 10 the intermediate portions whereof are adapted to embrace the adjacent section of the rotary dial 5 and the annular type disc secured thereto. The face of the pivotal member 9 is provided adjacent to the type face with a printing index 9ª in the form of an arrow. The other pivotal member 10 is adapted to press the ticket 11 and carbon ribbon 12 into contact with the type and the arrow. The pivotal member 10 is provided also with two superposed pairs of arms 10ª, 10ᵇ which serve to support spindles 13, 14 upon which are mounted spools 15, 16 for the carbon ribbon 12 the said ribbon passing over guides and over the face of the platen adjacent to the type face of the annular disc. The uppermost spool 15 is provided at one end with a ratchet wheel 15ª the teeth whereof cooperate with a spring controlled pawl 17 pivotally connected to the other pivotal member 9. At their lower ends the pivotal members 9 and 10 are formed with recesses within which are partially located spring pressed balls 18 the projecting portions of the said balls co-operating with cam surfaces 19ª formed in the jawed ends of a forked printing lever 19 fulcrumed on a spindle 20 carried by a bracket 21 secured to the casing. The outer end of the forked lever 19 projects outwardly through a slot formed in the casing and is provided adjacent its outer end with a finger grip 19b. Intermediate its ends the printing lever 19 is anchored to one end of a coil spring 22 the other end whereof is fixed to the casing the said coil spring 22 being disposed in the interior of the casing. Adjacent to their upper ends the pivotal members 9 and 10 are bowed outwardly and have disposed therebetween a double volute spring 23 the ends whereof are provided with spindles which engage within recesses formed in the said members the spring 23 normally tending to maintain the pivotal members 9 and 10 pressed apart.

The casing is formed with a slot 24 for the insertion of the tickets 11 said slot co-operating with a guide which ensures the correct positioning of the tickets 11 relatively to the type face and to the printing index.

Figure 4:
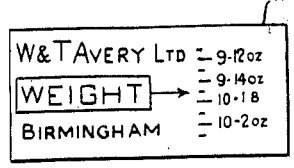
Figure 4 is an illustration of the form of ticket employed with the printing mechanism.

The operation of the printing mechanism is as follows:

When the weighing mechanism has attained equilibrium a ticket is inserted in the ticket slot and the finger piece 19b on the printing lever 19 pressed downwardly. This movement of the printing lever causes the cam faces 19a in the jawed ends of the said printing lever to move downwardly over the projecting ends of the balls 18 carried in the lower ends of the pivotal members 9 and 10 thereby moving the pivotal members inwardly and causing the platen carried by the one pivotal member and the opposite face of the other pivotal member to press the ticket 11 against the ribbon 12 and the type face 5a and the printing index 9a. Upon the release of the printing lever 19 the volute spring 23 forces the members 9 and 10 apart and admits of the withdrawal of the ticket 11. Upon withdrawal the ticket will be found to have marked thereon a reproduction of the portion of the type face 5a of the annular disc 5 together with an arrow pointing to the graduation corresponding to the weight on the weighing platform as seen in Figure 4.

It will be appreciated that the formation of the printing type on the face of a disc admits of a light printing disc being obtained and, furthermore, permits of greater accuracy and economy in manufacture owing to the fact that the graduations and type may be formed by an etching or electro-chemical process and not by the mechanical processes that have been necessary for the formation of type on the edge of a disc or drum as has been the practice heretofore. If preferred, however, instead of forming the type on the actual disc or drum by an etching or electro-chemical process the type face may be obtained by a pressing or moulding operation from a master matrix which itself is prepared by an etching or electro-chemical process. In addition, the printing mechanism is simple in construction and capable of being adapted to existing forms of weighing apparatus entailing rotary weight indicators without necessitating any material alteration thereto.

Although the invention has been described in its application to a weighting apparatus of the kind employing a rotary dial it will be understood that it is equally applicable to scales employing rotary dial indicators and similar forms of indicating mechanism.

What I claim is:—

1. A printing mechanism for weighing apparatus embodying a rotatable indicating mechanism, a member rotatable with said indicating mechanism, printing type carried on a face of said member, a record member adapted to receive an impression from the type, means for positioning the record member realtively to said type, a pair of pivotal members disposed one on either side of the rotatable member and means for bringing the pivotal members together in order to move the record member into contact with the printing type as and when required.

2. A printing mechanism for weighing apparatus embodying a rotatable indicating mechanism, a member rotatable with said indicating mechanism, printing type carried on a face of said member, a record member adapted to receive an impression from the type, means for positioning the record member relatively to said type, a pair of members pivotally connected at their upper end and adapted to straddle the said disc and means for simultaneously moving each of the pivotal members towards one another in order to move the record member into contact with the printing type as and when required.

3. A printing mechanism for weighing apparatus embodying a rotatable indicating mechanism, a disc rotatable with said indicating mechanism, a type ring on a face of said disc, a non-rotatable printing index, a record member adapted to receive an impression from the type face and index, means for positioning the record member relatively to said type face and index, a pair of members pivotally connected at their upper end and adapted to straddle the disc, an inking device and an operating member in engagement with each of the pivotal members and adapted to move the said members simultaneously towards one another when required in order to move the record member and inking device into contact with the printing index and type face.

In testimony whereof, I have signed my name to this specification.

WILLIAM TIMSON.